(12) United States Patent
Sun

(10) Patent No.: US 11,288,033 B2
(45) Date of Patent: Mar. 29, 2022

(54) METHOD FOR OUTPUTTING AUDIO DATA OF APPLICATIONS AND DISPLAY DEVICE

(71) Applicant: HISENSE VISUAL TECHNOLOGY CO., LTD., Shandong (CN)

(72) Inventor: Yongrui Sun, Shandong (CN)

(73) Assignee: HISENSE VISUAL TECHNOLOGY CO., LTD., Qingdao (CN)

(*) Notice: Subject to any disclaimer, the term of this patent is extended or adjusted under 35 U.S.C. 154(b) by 5 days.

(21) Appl. No.: 16/847,100

(22) Filed: Apr. 13, 2020

(65) Prior Publication Data

US 2020/0326907 A1 Oct. 15, 2020

Related U.S. Application Data

(63) Continuation of application No. PCT/CN2020/076488, filed on Feb. 24, 2020.

(30) Foreign Application Priority Data

Apr. 9, 2019 (CN) .......................... 201910281617.8

(51) Int. Cl.
*G06F 3/16* (2006.01)
*H04N 21/439* (2011.01)

(52) U.S. Cl.
CPC .............. *G06F 3/165* (2013.01); *G06F 3/167* (2013.01); *H04N 21/4394* (2013.01); *H04N 21/4396* (2013.01)

(58) Field of Classification Search
CPC ..... G06F 3/165; G06F 3/167; H04N 21/4394; H04N 21/4396
See application file for complete search history.

(56) References Cited

U.S. PATENT DOCUMENTS 9,342,516 B2   5/2016  Matthews, III et al.
10,117,083 B1* 10/2018  Sabatino ............. H04M 7/0012
(Continued)

FOREIGN PATENT DOCUMENTS

CN   106598539 A   4/2017
CN   106648534 A   5/2017
(Continued)

OTHER PUBLICATIONS

M. Torcoli, A. Freke-Morin, J. Paulus, C. Simon, and B. Shirley, "Background Ducking to Produce Esthetically Pleasing Audio for TV with Clear Speech," Paper 10175, (Mar. 2019.). (Year: 2019).*
(Continued)

*Primary Examiner* — James T Tsai
(74) *Attorney, Agent, or Firm* — Harness, Dickey & Pierce, P.L.C.

(57) ABSTRACT

The embodiments of the present disclosure disclose a method for outputting audio data of applications in a display device. The method includes: while first audio data of one or more first applications is playing by the display device through an audio output interface of the display device, receiving a first input instruction for playing second audio data of a second application; controlling output volume of the first audio data to be muted, and output volume of the second audio data to be maintained in response to the first input instruction; and outputting superimposed data of the muted first audio data and the second audio data with maintained output volume through the audio output interface.

8 Claims, 8 Drawing Sheets

(56) References Cited

U.S. PATENT DOCUMENTS

| | | | |
|---|---|---|---|
| 10,437,551 B1* | 10/2019 | Stanek | G06F 3/165 |
| 10,958,975 B2* | 3/2021 | Wittke | H04N 21/2387 |
| 2005/0237377 A1* | 10/2005 | Chapweske | H04N 7/15 |
| | | | 348/14.08 |
| 2007/0140187 A1* | 6/2007 | Rokusek | H04L 67/12 |
| | | | 370/338 |
| 2011/0085655 A1* | 4/2011 | Elliott | H04M 3/56 |
| | | | 379/242 |
| 2011/0289506 A1* | 11/2011 | Trivi | G06F 9/526 |
| | | | 718/104 |
| 2013/0167027 A1* | 6/2013 | Adolph | G06F 3/0482 |
| | | | 715/716 |
| 2014/0109003 A1* | 4/2014 | Saib | G06F 3/0482 |
| | | | 715/808 |
| 2016/0342384 A1* | 11/2016 | Lee | G06F 3/165 |
| 2016/0381199 A1* | 12/2016 | Pelly | H04L 67/02 |
| | | | 455/557 |

FOREIGN PATENT DOCUMENTS

| | | |
|---|---|---|
| CN | 107145328 A | 9/2017 |
| CN | 107832034 A | 3/2018 |
| CN | 110032357 A | 7/2019 |
| CN | 110321096 A * | 10/2019 |

OTHER PUBLICATIONS

Google Chrome Help, "No Sound After Pause Video" <URL=https://support.google.com/chrome/thread/15303636/no-sound-after-pause-video?hl=en> (Year: 2019).*

International Search Report and translation for application No. PCT/CN2020/076488 dated May 26, 2020 (7 pages).

Chinese Office Action and translation for Chinese Application No. 201910281617.8 dated Jan. 29, 2021(27 pages).

* cited by examiner

METHOD FOR OUTPUTTING AUDIO DATA OF APPLICATIONS AND DISPLAY DEVICE

CROSS-REFERENCE TO RELATED APPLICATION

The present application is a continuation application of International Application No. PCT/CN2020/076488, filed Feb. 24, 2020, which claims the priority to Chinese patent application No. 201910281617.8, filed on Apr. 9, 2019 and entitled "METHOD FOR OUTPUTTING AUDIO DATA OF APPLICATIONS AND DISPLAY DEVICE", the content of which is incorporated in the present application by reference.

FIELD

The present disclosure relates to the field of audio processing, particularly to a method for outputting audio data of applications and a display device.

BACKGROUND

In order to meet personalized needs of users, display devices may not only provide users with various traditional live program contents received via broadcast signals, but also provide users with various applications and service contents such as video on demand, online games, video chat, etc. provided by content service providers.

While providing the above contents, display devices can be controlled to perform functions associated with the above contents based on user's operation on physical hard keys or virtual keys on control devices such as remote controllers and mobile terminals, and can also be controlled to perform functions associated with the above contents by own microphones or user input voice received by microphones on control devices.

SUMMARY

The embodiments of the present disclosure provide a method for outputting audio data of applications and a display device, which allows for realizing the goal of playing audio data of only one application at a time in the display device, thereby improving the hearing experience of users.

In a first aspect, the embodiments of the present disclosure provide a method for outputting audio data of applications in a display device.

The method includes: while first audio data of one or more first applications is playing by the display device through an audio output interface of the display device, receiving a first input instruction for playing second audio data of a second application; in response to the first input instruction, controlling output volume of the first audio data to be muted, and output volume of the second audio data to be maintained; and outputting superimposed data of the muted first audio data and the second audio data with maintained output volume through the audio output interface.

In some embodiments, the method further includes: upon receiving the first input instruction, determining whether the second application needs to acquire an audio focus of an operating system in the display device; and in response to determining that the second application needs to acquire the audio focus, modifying an audio stream type corresponding to the second audio data.

In some embodiments, the determining whether the second application needs to acquire the audio focus of the operating system in the display device includes: determining a package name of the second application; determining whether the package name of the second application is included in a white list of pre-stored applications that need to acquire the audio focus; and in response to the package name of the second application being included in the white list, determining that the second application needs to acquire the audio focus.

In some embodiments, the second application includes a voice assistant application.

In some embodiments, the method further includes: determining whether there is a third audio data of a third application whose audio stream type has been modified; and in response to that there is a third application whose audio stream type has been modified, maintaining volume of the audio stream type corresponding to the third audio data of the third application and muting volume of audio stream types corresponding to audio data of applications other than the third application.

In some embodiments, the third application is the second application.

In some embodiments, the method further includes: receiving a second input instruction for stopping playing the second audio data; in response to the second input instruction, controlling the output volume of the first audio data to restore from muting to the volume before the first input instruction for playing the second audio data is received; and outputting the first audio data with restored output volume through the audio output interface.

In a second aspect, the embodiments of the present disclosure provide a method for outputting audio data of applications in a display device.

The method includes: while first audio data of one or more first applications is playing by the display device through an audio output interface of the display device, receiving a first input instruction for playing second audio data of a second application; and in response to the first input instruction, outputting the second audio data through the audio output interface, and not outputting the first audio data.

In some embodiments, the method further includes: determining whether the second application needs to acquire an audio focus of an operating system in the display device upon receiving the first input instruction; and marking the audio focus of the operating system as being occupied by the second application in response to determining that the second application needs to acquire the audio focus.

In some embodiments, the method further includes: determining whether the audio focus of the operating system in the current display device is occupied by another application upon receiving the first input instruction; not outputting the second audio data to the audio output interface in response to determining that the audio focus is occupied by another application; and outputting the second audio data to the audio output interface in response to determining that the audio focus is not occupied by another application.

In some embodiments, the method further includes: receiving a second input instruction for stopping playing the second audio data; and controlling restoring of outputting the first audio data through the audio output interface in response to the second input instruction.

In a third aspect, the embodiments of the present disclosure provide a display device. The display device includes a user interface, an audio output interface, a memory, and a controller.

The memory, which is in communication with the user interface and the audio output interface, is configured to store computer programs, instructions associated with the user interface, and audio data associated with the audio output interface.

The controller, which is in communication with the user interface, the audio output interface and the memory, is configured to execute the computer programs and/or the instructions to cause the display device to perform: while first audio data of one or more first applications is playing by the display device through the audio output interface of the display device, receiving a first input instruction for playing second audio data of a second application; controlling the output volume of the first audio data to be muted, and the output volume of the second audio data to be maintained in response to the first input instruction; and outputting the superimposed data of the muted first audio data and the second audio data with maintained output volume through the audio output interface.

In some embodiments, the controller is further configured to execute the computer programs and/or the instructions to cause the display device to perform: determining whether the second application needs to acquire an audio focus of an operating system in the display device upon receiving the first input instruction; and modifying an audio stream type corresponding to the second audio data in response to determining that the second application needs to acquire the audio focus.

In some embodiments, the controller is further configured to execute the computer programs and/or the instructions to cause the display device to perform: determining a package name of the second application; determining whether the package name of the second application is included in a white list of pre-stored application that need to acquire the audio focus; and in response to the package name of the second application being included in the white list, determining that the second application needs to acquire the audio focus.

In some embodiments, the second application includes a voice assistant application.

In some embodiments, the controller is further configured to execute the computer programs and/or the instructions to cause the display device to perform: upon receiving the first input instruction, determining whether there is a third audio data of a third application whose audio stream type has been modified; and in response to that there is a third application whose audio stream type has been modified, maintaining volume of the audio stream type corresponding to the third audio data of the third application, and muting volume of audio stream types corresponding to audio data of applications other than the third application.

In some embodiments, the third application is the second application.

In some embodiments, the controller is further configured to execute the computer programs and/or the instructions to cause the display device to perform: receiving a second input instruction for stopping playing the second audio data; controlling the output volume of the first audio data to restore from muting to volume before the first input instruction for playing the second audio data is received in response to the second input instruction; and outputting the first audio data with restored output volume through the audio output interface.

In a fourth aspect, the embodiments of the present disclosure provide a display device. The display device includes a user interface, an audio output interface, a memory, and a controller.

The memory in communication with the user interface and the audio output interface is configured to store computer programs, instructions associated with the user interface, and audio data associated with the audio output interface.

The controller in communication with the user interface, the audio output interface and the memory, is configured to execute the computer programs and/or the instructions to cause the display device to perform: while first audio data of one or more first applications is playing by the display device through the audio output interface of the display device, receiving a first input instruction for playing second audio data of a second application; and in response to the first input instruction, outputting the second audio data through the audio output interface, and not output the first audio data.

In some embodiments, the controller is further configured to execute the computer programs and/or the instructions to cause the display device to perform: upon receiving the first input instruction, determining whether the second application needs to acquire an audio focus of an operating system in the display device; and marking the audio focus of the operating system as being occupied by the second application in response to determining that the second application needs to acquire the audio focus.

In some embodiments, the controller is further configured to execute the computer programs and/or the instructions to cause the display device to perform: determining whether the audio focus of the operating system in the current display device is occupied by other applications upon receiving the first input instruction; not outputting the second audio data to the audio output interface in response to determining that the audio focus is occupied by the other applications; and outputting the second audio data to the audio output interface in response to determining that the audio focus is not occupied by other applications.

In some embodiments, the controller is further configured to execute the computer programs and/or the instructions to cause the display device to perform: receiving a second input instruction for stopping playing the second audio data; and controlling restoring of outputting the first audio data through the audio output interface in response to the second input instruction.

In the fifth aspect, the embodiments of the application provide a non-transitory computer readable storage medium, the storage medium stores computer programs, and the computer programs are executed by a processor of a display device to perform the method of the first aspect or the second aspect.

BRIEF DESCRIPTION OF THE DRAWINGS

In order to explain the embodiments of the present disclosure more clearly, the drawings needed in the description of the embodiments will be briefly introduced below. Obviously, the drawings in the following description are only some embodiments of the present disclosure. For those skilled in the art, other drawings can be obtained according to these drawings without any creative labor.

DETAILED DESCRIPTION OF THE EMBODIMENTS

In order to make the purpose, schemes and advantages of the present disclosure clearer, the present disclosure will be further described in detail in combination with the accompanying drawings. Obviously, the described embodiments are only part of the embodiments of the present disclosure, not all of the embodiments.

Based on the embodiments shown in the present disclosure, all other embodiments obtained by those skilled in the art without creative work shall fall within the scope of protection of the present disclosure. In addition, although the disclosed contents in the present disclosure are presented in accordance with one or more exemplary examples, it shall be understood that a complete scheme may be formed separately with each aspect of the disclosed contents.

It shall be understood that the terms "include" and "have" used in the present disclosure and any variations thereof intend to refer to non-exclusive inclusions. For example, products or devices that include a series of components are not limited to those components clearly described, but may include other components that are not clearly described or inherent to these products or devices.

The term "module" used in the present disclosure refers to any combination of known or later developed hardware, software, firmware, artificial intelligence, fuzzy logic or hardware or/and software code, and the combination is capable of performing the functions related to the components.

The term "gesture" used in the present disclosure refers to a user behavior for expressing a predetermined idea, action, purpose and/or result by means of a shape change of a hand or movement of a hand.

Figure 1A:
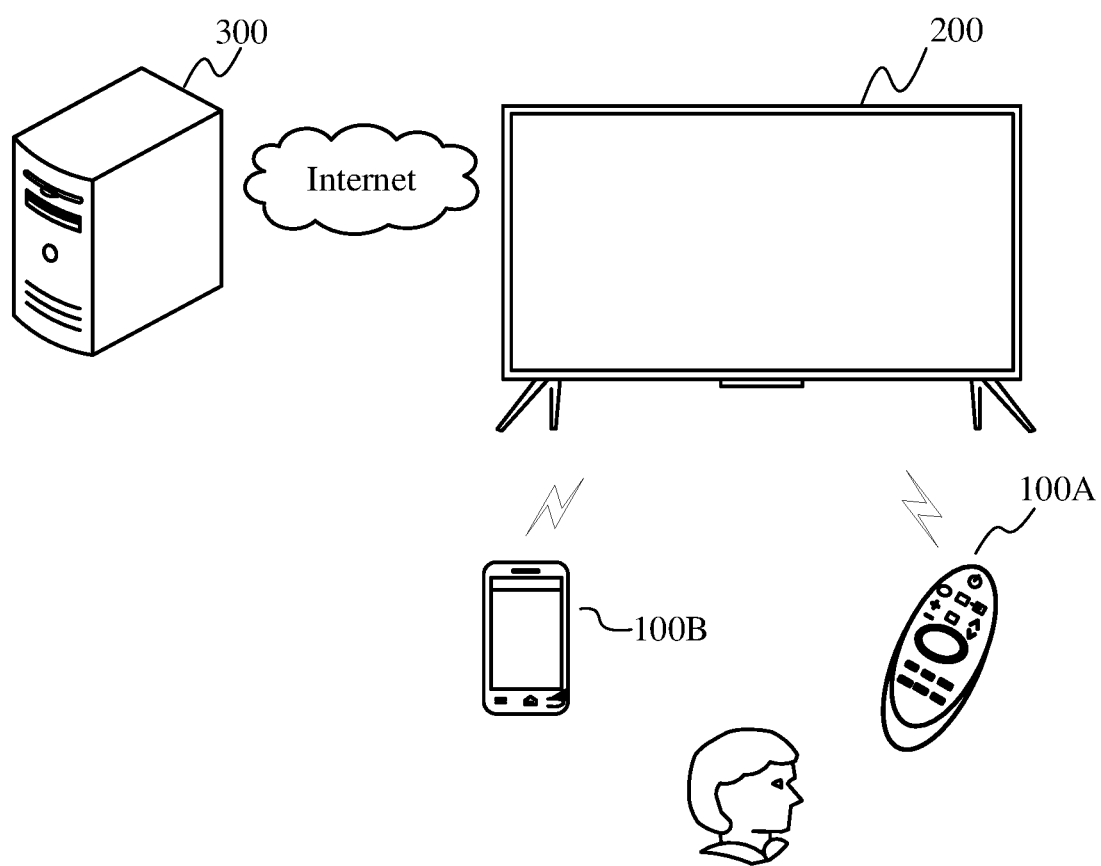
FIG. 1A illustrates a schematic diagram of an operation scenario between a display device 200 and a control device 100.

FIG. 1A illustrates a schematic diagram of an operation scenario between a display device 200 and a control device 100. As shown in FIG. 1A, the control device 100 may be in communication with the display device 200 in a wired or wireless way.

The control device 100 is configured to control the display device 200. The control device 100 may receive an operation instruction input from a user, and converts the operation instruction into an instruction that may be recognized and responded by the display device 200 to play an interconnect role in realizing the information interaction between the user and the display device 200.

In some embodiments, the user issues an instruction for controlling channel scroll-up and scroll-down to the display device 200 by operating channel scroll-up and scroll-down keys on the control device 100, and the display device 200 receives and responds to the instruction and performs the channel scroll-up and scroll-down operations.

The control device 100 may be a remote controller 100A. The remote controller 100A may realize an infrared protocol communication, a Bluetooth protocol communication, or other short distance communication. The remote controller 100A controls the display device 200 in wireless or other wired ways. The user can control the display device 200 by inputting user instructions through physical or virtual keys, a voice interface, a control panel interface, etc. on the remote controller 100A.

In some embodiments, the user can control the display device 200 by inputting the corresponding control instructions through the physical or virtual keys such as a volume-up button or a volume-down button, a channel control key, an up/down/left/right navigation button, a voice input key, a menu key, and an on/off key on the remote controller 100A.

The control device 100 may also be a smart device such as a mobile terminal 100B, a tablet computer, a computer, a notebook computer, etc. For example, the user may control the display device 200 via applications running on the smart device, and may also configure the applications. The configured applications can cast onto a screen associated with the smart device, so that the user can visually control the display device 200 through a visual user interface (UI).

In some embodiments, the mobile terminal 100B and the display device 200 install the same and/or associated software applications so as to achieve communication through a network communication protocol, to thereby realize one-to-one control operation and data communication.

In some embodiments, a control instruction protocol may be established between the mobile terminal 100B and the display device 200. Corresponding functions may be realized by operating various physical or virtual keys on the user interface of the mobile terminal 100B by the user. For example, the user can operate physical keys arranged on the remote controller 100A to realize functions corresponding to the physical keys; alternatively, the audio and video contents displayed on the mobile terminal 100B may be transmitted to the display device 200 to realize a synchronous display function.

The display device 200 may provide network TV functions such as receiving broadcasting, computer support functions, etc. The display device 200 may be implemented as a digital TV, a network TV, an Internet protocol television (IPTV), etc.

The display device 200 may be a liquid crystal display, an organic light emitting display, and a projection device. In the embodiments of the present application, the specific type, size and resolution of the display device are not limited.

The display device 200 is able to communicate with a server 300 in a variety of communication ways. In some embodiments, the display device 200 is in communication connection with the server 300 via a local area network (LAN), a wireless local area network (WLAN) or other networks.

The server 300 provides various contents and interactions to the display device 200.

In some embodiments, the display device 200 may send and receive information.

For example, the display device 200 receives electronic program guide (EPG) data, receives software program updates, etc., or accesses remotely stored digital media libraries.

The server 300 may include one or more groups of servers which may be one or more types of servers. The server 300 may provide network service contents such as video on demand and advertising services.

Figure 1B:
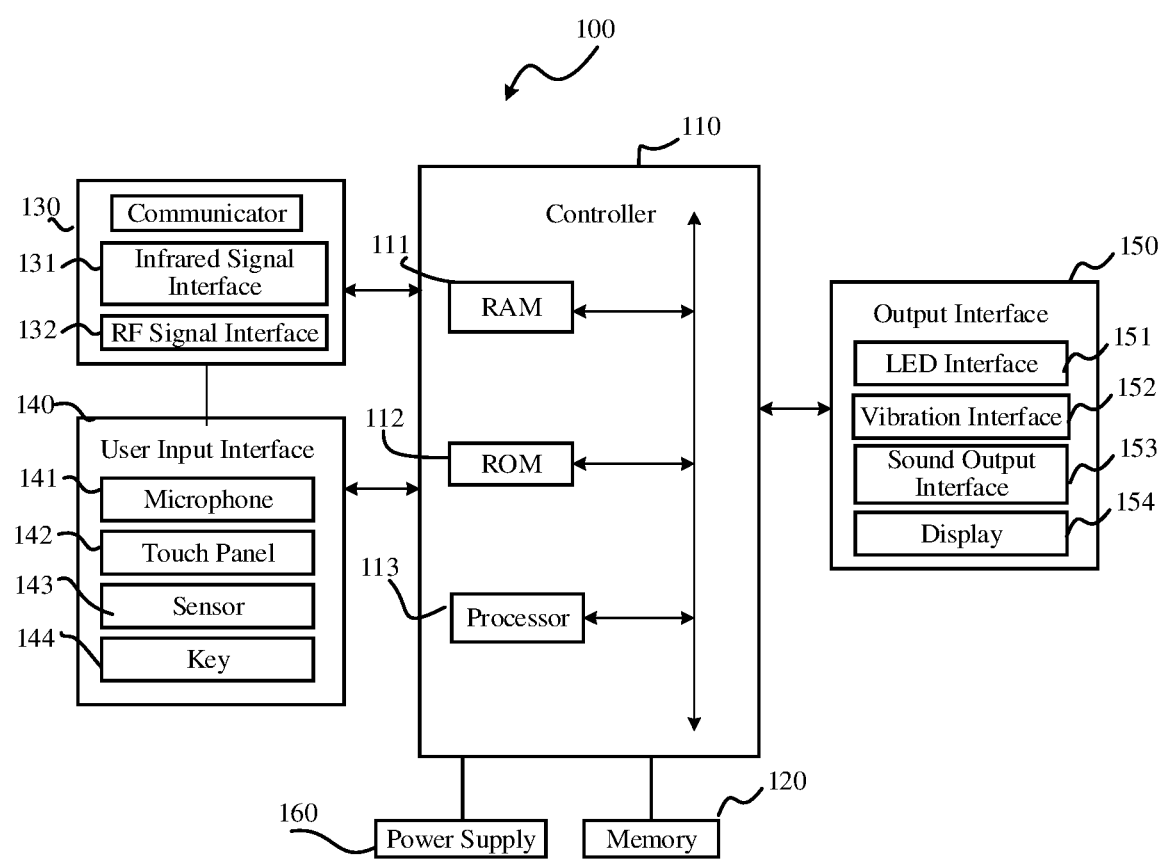
FIG. 1B illustrates a configuration block diagram of the control device 100 in FIG. 1A.

FIG. 1B illustrates a configuration block diagram of the control device 100. As shown in FIG. 1B, the control device 100 includes a controller 110, a memory 120, a communicator 130, a user input interface 140, an output interface 150, and a power supply 160.

The controller 110 includes a random access memory (RAM) 111, a read-only memory (ROM) 112, a processor 113, a communication interface (not shown) and a communication bus (not shown).

The controller 110 is used to control the running and operation of the control device 100, communication cooperation among internal components as well as external and internal data processing.

In some embodiments, when interactions such as a user's press the key on the remote controller 100A or touch the touch panel on the remote controller 100A are detected, the controller 110 can generate a control signal corresponding to the detected interaction and transmit the control signal to the display device 200.

The memory 120 is used to store various operation programs, data and applications for driving and controlling the control device 100 under the control of the controller 110.

The memory 120 may store various control signal instructions input from the user.

The communicator 130 can communicate with the display device 200 via the control signal and the data signal under the control of the controller 110.

In some embodiments, the control device 100 transmits a touch signal, a button signal and other control signals to the display device 200 through the communicator 130. The control device 100 receives the signal sent from the display device 200 through the communicator 130.

The communicator 130 includes an infrared signal interface 131 and a radio frequency signal interface 132.

In some embodiments, when the communicator 130 includes an infrared signal interface, the communicator 130 needs to convert the user input instruction into an infrared control signal in accordance with an infrared control protocol, and then the infrared control signal is sent to the display device 200 by an infrared transmission circuit.

In some embodiments, when the communicator 130 includes a radio frequency signal interface, the communicator 130 needs to convert the user input instruction into a digital signal, and then the digital signal sent to the display device 200 by a radio frequency transmission terminal after being modulated in accordance with a radio frequency control signal modulation protocol.

The user input interface 140 includes at least one of a microphone 141, a touch panel 142, a sensor 143, a key 144, etc., to thereby enable the user to input the user instruction for controlling the display device 200 to the control device 100 through voice, touch, gesture, press and other operations.

The output interface 150 outputs the user instruction received from the user input interface 140 to the display device 200, or outputs images or voice signals received by the display device 200.

The output interface 150 includes an LED interface 151, a vibration interface 152 for generating vibration, a sound output interface 153 for outputting sound, a display 154 for outputting images, etc.

For example, the remote controller 100A can receive output signals such as audio, video, or data from the output interface 150, and display the output signals in the form of images on the display 154, in the form of audio on the sound output interface 153, or in the form of vibration on the vibration interface 152.

The power supply 160 is used to provide operating power support for each component of the control device 100 under the control of the controller 110. The power supply 160 is configured as a battery and related control circuit.

Figure 1C:
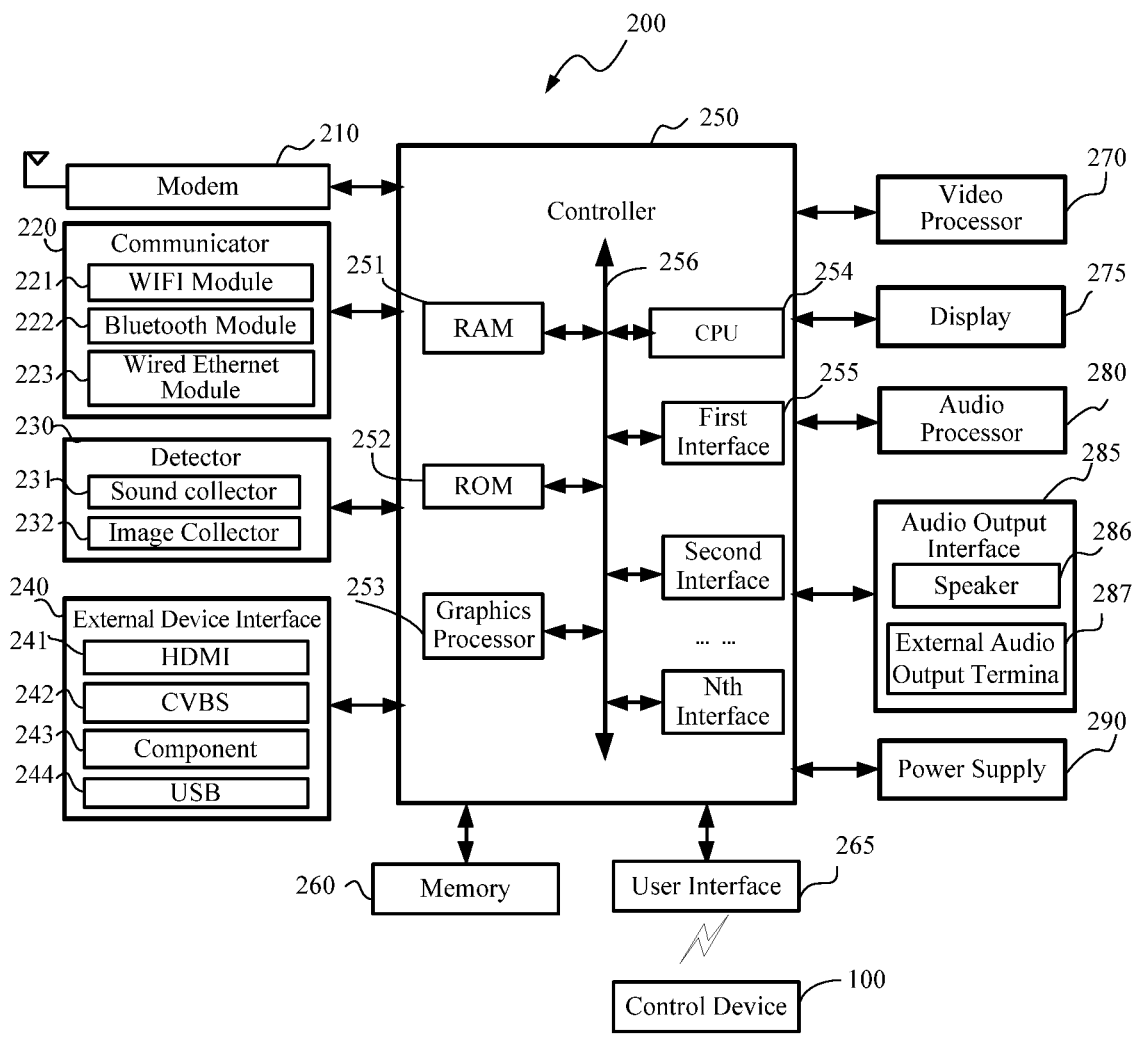
FIG. 1C illustrates a configuration block diagram of the display device 200 in FIG. 1A.

FIG. 1C illustrates a hardware configuration block diagram of the display device 200. As shown in FIG. 1C, the display device 200 may include a modem 210, a communicator 220, a detector 230, an external device interface 240, a controller 250, a memory 260, a user interface 265, a video processor 270, a display 275, an audio processor 280, an audio input interface 285, and a power supply 290.

The modem 210 may receive radio and television signals in a wired or wireless way and perform modulation and demodulation processing such as amplification, frequency mixing and resonance oscillation, and is used to demodulate out the audio-video signal and additional information (such as EPG data) carried by the frequency of the TV channel selected by the user from multiple wireless or wired radio and television signals.

The modem 210 may respond to the frequency of the TV channel selected by the user and a TV signal carried by the frequency according to user's choice under the control of the controller 250.

The modem 210 may receive signals in many ways according to different broadcasting systems of TV signals, such as terrestrial broadcasting, wired broadcasting, satellite broadcasting or Internet broadcasting, etc., adopt a digital modulation or analog modulation according to different modulation types and demodulate analog and digital signals according to different types of the received TV signals.

In some other exemplary embodiments, the modem 210 may also be provided in an external device such as an external set-top box, etc. In this way, the set-top box outputs a TV signal through modulation and demodulation, and inputs the TV signal to the display device 200 through the external device interface 240.

The communicator 220 is a component for communicating with external devices such as external servers according to various communication protocols.

For example, the display device 200 may send content data to an external device connected via the communicator 220, or browse and download content data from an external device connected via the communicator 220.

The communicator 220 includes a network communication protocol module or a near field communication protocol module such as a WiFi module 221, a Bluetooth communication protocol module 222 and a wired Ethernet communication protocol module 223, to thereby enable the communicator 220 to receive a control signal of the control device 100 under the control of the controller 250, and realize the control signal as a WiFi signal, a Bluetooth signal, an RF signal, etc.

The detector 230 is a component of the display device 200, for collecting signals from or interacting with an external environment. The detector 230 may include a sound collector 231, such as a microphone. The detector 230 is used to receive a voice signal corresponding to user voice, such as a voice signal corresponding to the control instruction from the user by controlling the display device 200; or, the detector 230 may collect the environmental sound used for identifying the type of an environment scene, such that the display device 200 may self-adapt to the environmental noise.

In some embodiments, the detector 230 includes an image collector 232, such as a camera, and the like. The detector 230 is used to collect an external environment scene to self-adapt to the change of display parameters of the display device 200 and to collect user attributes or interact with the user by gestures to realize an interaction function between the display device and the user.

In some embodiments, the detector 230 includes an optical receiver for collecting environmental light intensity to self-adapt to the change of the display parameters of the display device 200, etc.

In some embodiments, the detector 230 includes a temperature sensor. For example, a display device 200 may self-adapt to the adjustment of the display color temperature of an image by sensing the environmental temperature.

In some embodiments, in an environment with relatively high temperature, the color temperature of the displayed image on the display device 200 may be adjusted to be cooler; in an environment with relatively low temperature, the color temperature of the displayed image on the display device 200 may be adjusted to be warmer.

The external device interface 240 is a component for a controller 210 to control data transmission between the display device 200 and the external device.

The external device interface 240 may be connected with external devices such as set-top boxes, game devices and notebook computers in a wired/wireless way and may receive data such as video signals (e.g., motion images), audio signals (e.g., music), and additional information (e.g., EPG) from the external devices.

The external device interface 240 includes any one or more of a high-definition multimedia interface (HDMI) terminal 241, a compound video blanking synchronization (CVBS) terminal 242, an analog or digital component terminal 243, a universal serial bus (USB) terminal 244, a component terminal (not shown), a red-green-blue (RGB) terminal (not shown), etc.

The controller 250 controls the operation of the display device 200 and responds to the users' operation by running various software control programs (such as an operating system and various applications) stored in the memory 260.

As shown in FIG. 1C, the controller 250 includes an RAM 251, an ROM 252, a graphics processor 253, a CPU 254, communication interface 255 and communication bus 256.

Wherein, the RAM 251, the ROM 252, the graphics processor 253, the CPU 254 and the communication interface 255 are connected through the communication bus 256.

The ROM 252 is used to store various system startup instructions. For example, when a power-on signal is received, the power supply of the display device 200 starts up, the CPU 254 runs the system startup instruction in the ROM 252 and copies the operating system stored in the memory 260 to the RAM 251 to start running the operating system. After the operating system is started, the CPU 254 copies various applications in the memory 260 to the RAM 251 again, and then various applications start to run.

The graphics processor 253 is used to generate various graphics objects, such as icons, operation menus, and graphics displayed as user input instructions, etc. The graphics processor 253 may include an arithmetic unit for performing operations by receiving various interactive instructions input from the user, thereby displaying various objects according to the display attributes; and a renderer for generating various objects based on the arithmetic unit and displaying the rendered results on the display 275.

The CPU 254 is used to execute the operating system and application instructions stored in the memory 260, as well as execute processing of various applications, data and contents according to the received user input instructions, thereby displaying and playing various audio and video contents in the end.

In some exemplary embodiments, the CPU 254 may include a plurality of processors. The plurality of processors may include a main processor and a plurality of or one sub processor. The main processor is used for performing some initialization operations of the display device 200 in the display device preloading mode, and/or displaying the operation of the screen in the normal mode. The plurality of or one sub processor is used to perform an operation in modes such as the display device standby mode.

The communication interface 255 may include a first interface to an Nth interface. These interfaces may be network interfaces that are connected to external devices via a network.

The controller 250 may control the overall operation of the display device 200. For example, in response to the received user input instruction for selecting graphical user interface (GUI) object to be displayed on the display 275, the controller 250 may perform operations related to the object selected by the user input instruction.

Wherein, the object may be any one of available objects such as a hyperlinks or icons. The operation related to the selected object is to, for example, display hyperlinks which link to pages, documents, images and so on, or execute programs corresponding to the objects. The user input instruction for selecting the GUI object may be an instruction input by various input devices connected to the display device 200 or a voice instruction corresponding to user's voice. For example, the input device may be a mouse, a keyboard and a touchpad.

The memory 260 is used to store various types of data, software programs, or applications that drive and control the display device 200 to run. The memory 260 may be a volatile and/or non-volatile readable memory. The term "memory" includes a memory 260, an RAM 251 and an ROM 252 of the controller 250, or a memory card in the display device 200.

In some embodiments, the memory 260 is specifically used to store the operation program for driving the controller 250 in the display device 200; store various applications built in the display device 200 and downloaded by the user from external devices; store various GUIs provided by the display 275, various objects related to the GUI, data such as visual effect images of selectors for selecting GUI objects.

In some embodiments, the memory 260 is specifically used to store drive programs and related data of the modem 210, the communicator 220, the detector 230, the external device interface 240, the video processor 270, the display 275, the audio processor 280, etc., external data received from the external device interface (such as audio and video data) or user data received from user interface (such as key information, voice information, touch information, etc.).

In some embodiments, the memory 260 specifically stores software and/or programs for representing the operating system (OS). The software and/or programs may include, for example, a kernel, a middleware, an application programming interface (API), and/or applications. Exemplarily, the kernel may control or manage system resources and functions implemented by other programs (such as middleware, API or applications); meanwhile, the kernel may provide interfaces to allow middleware, API or applications to access the controller to control or manage the system resources.

Figure 1D:
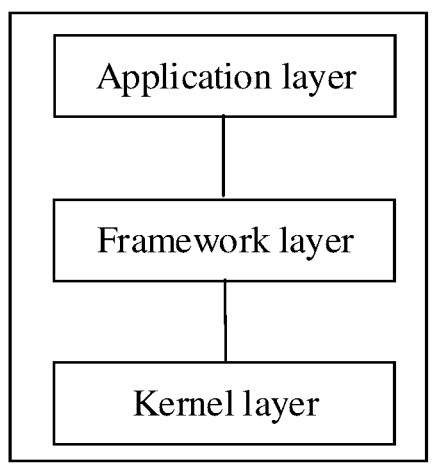
FIG. 1D illustrates a configuration block diagram of architecture of an operating system in a memory of a display device 200.

FIG. 1D illustrates a configuration block diagram of architecture of an operating system in the memory of the display device 200. From top to bottom, the architecture of the operating system includes an application layer, a framework layer and a kernel layer.

All system built-in applications and non-system applications belong to the application layer which is responsible for direct interaction with users. The application layer may include a plurality of applications, such as a live TV application, a video on demand application, a media center application, a screenshot application, etc.

The live TV application may provide live TV through different signal sources. For example, the live TV application may provide TV signals using input from cable TV, wireless broadcast, satellite service, or other type of live TV service. And, the live TV application may display the video of the live TV signal on the display device 200.

The video on demand application may provide videos from different storage sources. Unlike the live TV application, video on demand provides video display from some storage sources. For example, video on demand may come from the server side of cloud storage and the local hard disk storage containing stored video programs.

The media center application may provide a variety of applications for multimedia content playing. For example, the media center may be different from live TV or video on demand, and the user may access various images or audio and video stored in the memory through the media center application.

The screenshot application may take screenshot of the current display screen on the display, and mark the identified objects (such as people, channel logo, building, etc.) in the screenshot image with identification frame, name, etc., which provides the user with the presentation of various identification information on the display screen. The current displaying screen may include at least one of text, image and video.

The framework layer is responsible for providing API required by the application layer. For example, the live TV application, the video on demand application and the media center application may call the decoder to decode audio and video through the interface provided by the framework layer. For another example, the screenshot application may call the captured screenshot of the current display screen through the interface provided by the framework layer.

The kernel layer provides core system services, such as file management, memory management, process management, network management and system security authority management. The kernel layer may be implemented as a kernel based on various operating systems, for example, the kernel of Android operating system.

The kernel also provides communication between system software and hardware, and device driver services for various hardware, such as a display driver program for a display, a camera driver program for a camera, a key driver program for a remote controller, a WiFi driver program for a WiFi module, an audio driver program for an audio output interface, and a power management driver for a power management (PM) module.

The user interface 265 receives various user interactions. Specifically, the user interface 265 is used to send an input signal from the user to the controller 250 or transmit an output signal from the controller 250 to the user. Exemplarily, the remote controller 100A may send input signals such as power on/off signals, channel selection signals and volume adjustment signals input from the user to the user interface 265, and then transmit the input signals from the user interface 265 to the controller 250; or, the remote controller 100A may receive output signals such as audio, video or data output from the user interface 265 after being processed by the controller 250 and display the received output signals or output the received output signals in an audio or vibration form.

In some embodiments, a user may input a user instruction to the GUI displayed on the display 275, and the user interface 265 receives the user input instruction through the GUI. To be specific, the user interface 265 may receive the user input instruction for controlling the location of a selector in the GUI to select different objects or items.

Alternatively, the user may input the user instructions by inputting specific sounds or gestures, and then, the user interface 265 may recognize the sounds or gestures through sensors to receive the user input instruction. The video processor 270 is used to receive external video signals. Video data processing such as decompression, decoding, scaling, noise reduction, frame rate conversion, resolution conversion, image synthesis are performed according to a standard coding and decoding protocol of the input signals, so that the video signals displayed or played directly on the display 275 may be obtained.

Exemplarily, the video processor 270 includes a demultiplexing module, a video decoding module, an image synthesis module, a frame rate conversion module, a display formatting module, etc.

Wherein, the demultiplexing module is used to demultiplex the input audio and video data stream, such as the input MPEG-2 stream (based on the compression standard of digital storage media moving image and voice), which can be demultiplexed into a video signal and an audio signal by the demultiplexing module.

The video decoding module is used to process the demultiplexed video signal, including decoding, scaling, etc.

The image synthesis module, such as image synthesizer, is used for superimposing and mixing the video image after scaling with the GUI signal generated by the graphic generator in accordance with input by the user or generated by itself, so as to generate the image signal for displaying.

The frame rate conversion module is used to the convert frame rate of input video, such as converting the frame rate of input 60 Hz video to the frame rate of 120 Hz or 240 Hz, and the usual format is realized by frame interpolation.

The display formatting module is used to change the signal output by the frame rate conversion module to a signal that conforms to the display format of the display, such as converting the format of the signal output by the frame rate conversion module for outputting the RGB data signal.

The display 275 is used to receive image signals input from the video processor 270 to display video content, images and menu control interfaces. The displayed video content may either be the video content in the broadcast signal received by the modem 210, or the video content input by the communicator 220 or the external device interface 240. The display 275 displays the user control interface UI generated in the display device 200 and used for controlling the display device 200 simultaneously.

Also, the display 275 may include a display component for presenting frames and a driving component for driving image displaying. Alternatively, if the display 275 is a projection display, the display 275 may also include a projection apparatus and a projection screen.

The audio processor 280 is used to receive external audio signals and perform audio data processing such as decompressing and decoding, as well as noise reduction, digital-to-analog conversion, and amplification processing according to the standard coding and decoding protocol of the input signals, so as to obtain the audio signals that may be played in a speaker 286.

For example, the audio processor 280 may support various audio formats such as MPEG-2, MPEG-4, advanced audio coding (AAC) and highly efficiency AAC (HE-AAC).

The audio output interface 285 is used to receive audio signals output from the audio processor 280 under the control of the controller 250. The audio output interface 285 may include a speaker 286 or an external audio output terminal 287 such as a headphone output terminal which is output to a sound production device of an external device.

In some embodiments, the video processor 270 may include one or more chips. The audio processor 280 may also include one or more chips.

And, in some other exemplary embodiments, the video processor 270 and the audio processor 280 may either be an individual chip or be integrated with the controller 250 into one or more chips.

The power supply 290 is used to provide power input by an external power supply as power supply support to the display device 200 under the control of the controller 250. The power supply 290 may be either a built-in power circuit arranged inside the display device 200 or a power supply arranged outside the display device 200. It should be noted that on the basis of the above FIG. 1A-1D, the display device may receive voice input from the user through its own voice collector 231 (which may be realized as a microphone) or the microphone 141 on the control device, and be controlled to perform functions associated with various contents it provides.

Wherein, a voice assistant application may be set in the display device to provide voice interaction between the display device and the user for the user to control the display device to perform various functions by voice.

For example, when the user presses the voice key on the control device while speaking "inquire the weather forecast of QD city", the microphone on the control device receives and recognizes the voice and transmits the voice to the display device. The display device may respond to the voice instruction and start the voice assistant application, and inquire the weather forecast information of the certain place from the server through the voice assistant application, then display the weather forecast information inquired on the display and broadcast the weather forecast information inquired through the audio output interface.

For another example, when the user speaks "I want to watch A's movies", after the microphone on the display device receives and recognizes the voice, the voice assistant application can be initiated to inquire the movie information played by A from the server in response to the voice instruction, then the inquired movie information may be displayed on the display and broadcasted through the audio output interface.

However, for example, in the process of the display device playing the audio and video content provided by a video on demand application, the user needs to perform the above voice control function on the display device. At this time, the audio output interface usually outputs the voice of the audio and video content provided by the video on demand application, and the voice produced from the interaction between the user and the display device through the voice assistant application at the same time. In this way, the user actually pays more attention to the voice interaction with the display device rather than watching the audio and video content at this time, which makes it difficult for the user to distinguish the voice output from the voice assistant application. This does not fit the user's current intention to perform the operation. At the same time, because the microphone may collect not only the user input voice, but also the sound output of audio and video content, which, to some extent, affects the accuracy and efficiency of voice recognition.

Therefore, the present embodiments provide an output control method for the audio data of applications in a display device with the purpose of controlling the audio output interface in the above example to only play the audio data of the voice assistant application, but not the audio data of the video on demand application, so as to conform to the user's operation intention and improve the user hearing experience.

These embodiments describe the output control method of audio data of applications in a display device by taking FIG. 1D where the operating system in the memory is the Android operating system as an example.

Figure 2:
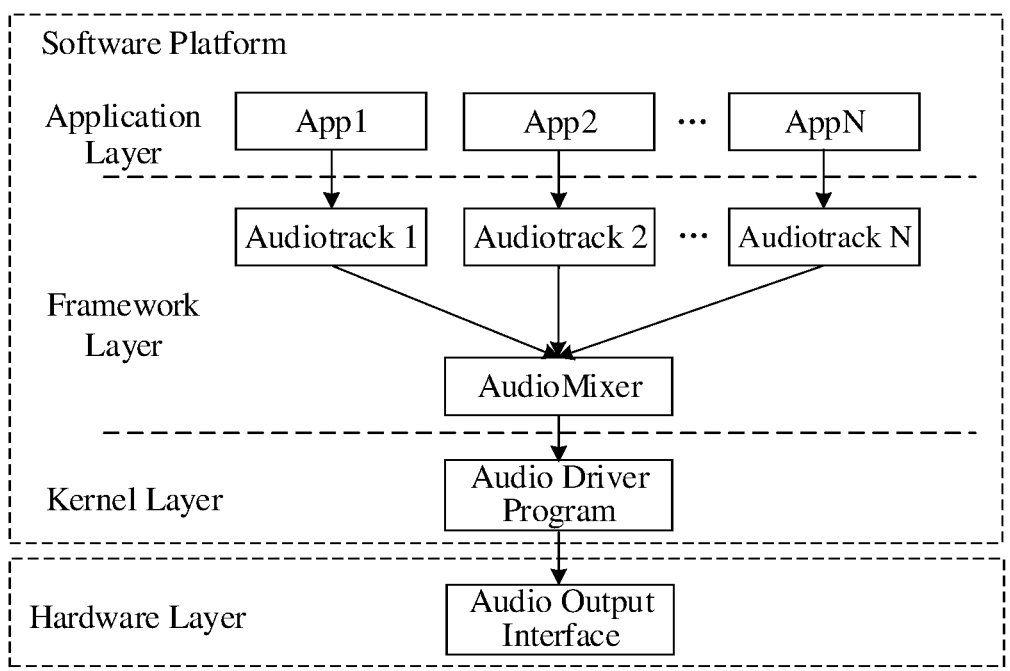
FIG. 2 shows a schematic diagram of architecture of audio data output of various applications in the display device.

FIG. 2 shows an architectural diagram of audio data output of applications in a display device.

Next, the related terms in the Android operating system involved in the embodiment will be explained.

App refers to the application that needs to output audio data to an audio output interface (such as a loudspeaker).

Audiotrack refers to the path applied by the application from the display device for transmitting audio data. Here, each application needs to request its own corresponding path for transmitting audio data.

AudioMixer is used to superimpose the audio data transmitted by all applications through the corresponding Audiotracks.

StreamType is used to indicate the audio stream type corresponding to the audio data transmitted in AudioTrack, such as, Stream_music and Stream_notification.

Volume is, specifically, the volume of the audio stream type; here, the volume of the audio stream type may be directly set by calling setstreamvolume( ).

Db(decibel) is a unit of measurement used to indicate how aloud a sound is.

It should also be noted that in the Android operating system, when the display device plays audio data of an App, that is, when the App uses audio resources such as AudioMixer, the audio output interface, etc., it is necessary to first request for AudioFocus from the operating system of the display device, and then use the audio resources after the App obtains the audio focus.

As shown in FIG. 2, the App1~AppN that need to play audio data should first send requests to the operating system of the display device for AudioTrack1~AudioTrackN that transmit their audio data. After that, AudioTracks that have been assigned transmit the audio data to AudioMixer for mixing; during mixing, AudioMixer performs superimposing according to the Db value of the audio data transmitted in each AudioTrack and the Volume of audio StreamType (this superimposing may be briefly described as a Db* Volume algorithm). Finally, AudioMixer outputs the mixed audio data from the audio output interface (such as a speaker) through the audio driver program.

Figure 3A:
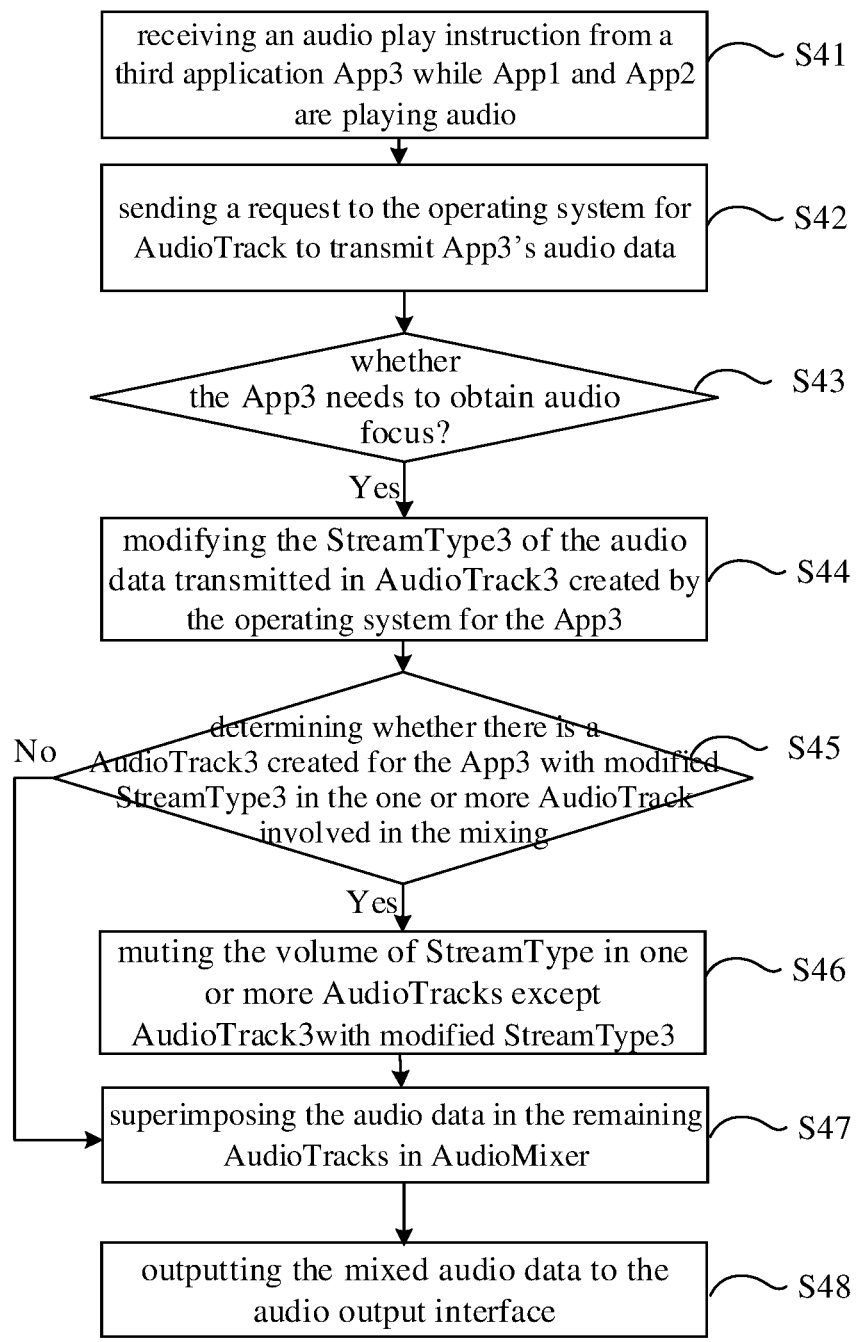
FIG. 3A shows a flow chart of a first output control method for audio data of applications in a display device.
Figure 3B:
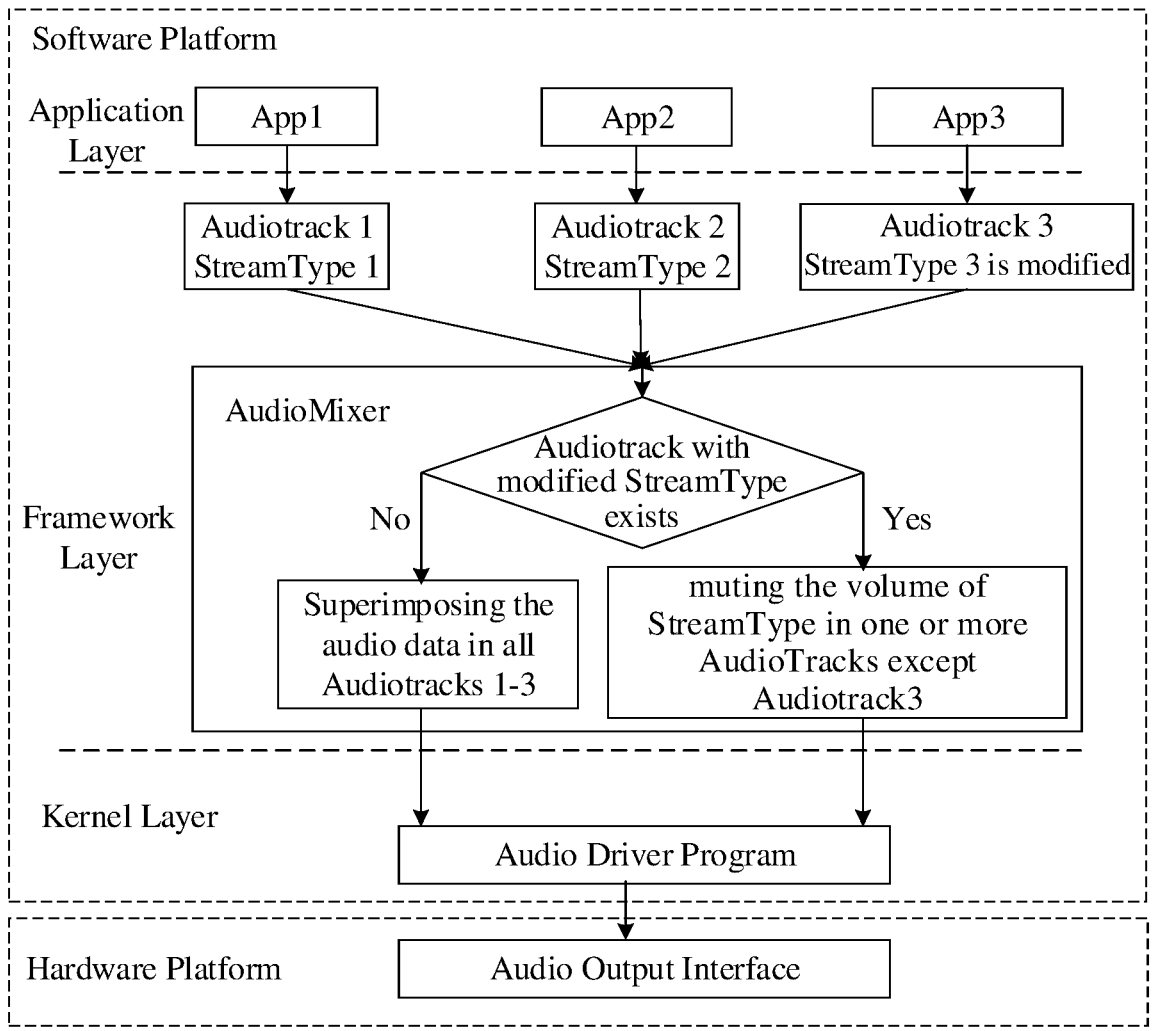
FIG. 3B shows a flow chart of a second output control method for audio data of applications in a display device.

FIG. 3A and FIG. 3B show the flow chart of an output control method for audio data of applications in a display device.

With reference to FIG. 3A and FIG. 3B, the method includes the following steps.

Step S41: while a first application App1 and a second application App2 are playing audio, receiving an audio play instruction from a third application App3.

Step S42: sending a request to the operating system for AudioTrack to transmit App3's audio data.

Step S43: determining whether the App3 needs to obtain audio focus; if it is determined that the App3 needs to obtain audio focus, executing step S44; otherwise, terminating the process.

Step S44: modifying the StreamType3 of the audio data transmitted in AudioTrack3 created by the operating system for the App3.

Specifically, when the App3 requests for AudioTrack from the operating system, the framework layer obtains a process number of the current AudioTrack requesting process from the operating system, and then queries the package name of the App3 corresponding to the process number. The display device may prestore the applications that need to obtain the audio focus in a white list, for example, putting the package name of the voice assistant application in the white list; and the application in the white list may be dynamically adjusted. In this way, the framework layer compares the package name of the application prestored in the white list with the package name of the App3 corresponding to the AudioTrack requesting process to determine whether the App3 needs to obtain the audio focus.

For example, the package name of the voice assistant application is prestored in the white list. Then, when the framework layer determines that the package name of the App3 corresponding to the current AudioTrack applying process is the voice assistant application, it is determined that the App3 needs to obtain the audio focus, and then StreamType3 of the audio data transmitted in AudioTrack3 created for the App3 is modified, such as Stream_music is modified to Stream_special.

In some embodiments, the StreamType of the audio data transmitted in AudioTrack and created by the operating system for the App1 to the App3 can be all of the same type, for example, all of them are Stream_music. In this way, modifying the StreamType3 of the audio data transmitted in AudioTrack3 created for the App3 from Stream_music to Stream_special can facilitate the subsequent recognition of the AudioTrack with modified StreamType when mixing in AudioMixer for corresponding processing.

When the framework layer determines that the package name of the App3 corresponding to the current AudioTrack requesting process is not the voice assistant application, it is determined that the App3 does not need to obtain the audio focus, then the step of modifying the StreamType3 of the audio data transmitted in AudioTrack3 created for the App3 may be omitted.

Step S45: determining whether there is a AudioTrack3 created for the App3 with modified StreamType3 in the one or more AudioTrack involved in the mixing; if so, that is the AudioTrack3 with modified StreamType3 is one of the one or more AudioTrack involved in the mixing, going to step S46 and then step S47; otherwise, directly going to step S47.

Step S46: muting the volume of StreamType in the one or more AudioTrack except AudioTrack3 with modified StreamType3.

Step S47: superimposing the audio data in the remaining AudioTracks in AudioMixer.

Step S48: outputting the mixed audio data to the audio output interface.

Specifically, during mixing in AudioMixer, in AudioTrack1~AudioTrack3 involved in the mixing, if the framework layer determines that AudioTrack3 created for the App3 and with modified StreamType3 of audio data exists while the AudioTrack3 is active, the volume of StreamType1 of audio data in AudioTrack1 and StreamType2 of audio data in AudioTrack2 is muted (that is, the volume of StreamType1 and StreamType2 is set to 0 by calling setStreamVolume( )), and the volume of StreamType3 of audio data in AudioTrack3 is maintained, so that when the audio data in the AudioTrack1~AudioTrack3 involved in the mixing is superimposed in accordance with Db* Volume algorithm, mixed audio data (including the audio data of App1~AudioTrack2 after mute and the audio data of App3 without muting) is obtained, thus the user can only hear the audio data of App3 from the audio output interface, which matches the user's current operation intention and improves the user hearing experience.

When the framework layer determines that AudioTrack3 created for the App3 and with modified StreamType3 of audio data does not exist, the audio data in the AudioTrack1~AudioTrack3 involved in the mixing is directly superimposed in accordance with Db* Volume algorithm to obtain the audio data of multiple applications, thus the user can hear the audio data of multiple applications from the audio output interface.

Here, the framework layer determines whether AudioTrack is active, which specifically means that the framework layer determines whether App transmits audio data to the AudioTrack it has requested. If the App transmits audio data to the requested AudioTrack, the AudioTrack is determined to be active; otherwise, the AudioTrack is inactive.

In addition, in Step S45, when the framework layer determines that AudioTrack3 created for the App3 and with modified StreamType3 is switched to an inactive state or is destroyed (for example, after the display device executes the step of exiting from the App3 when receiving an instruction to stop the App3), the framework layer will unmute the volume of StreamType in other AudioTrack in step S46, i.e. restore the volume of StreamType in other AudioTrack to the level before muting (i.e. restore the volume of StreamType1 and StreamType2 respectively by calling setStreamVolume( )), and output the audio data in the one or more AudioTrack involved in the mixing to the audio output interface after superimposing the audio data.

Figure 4A:
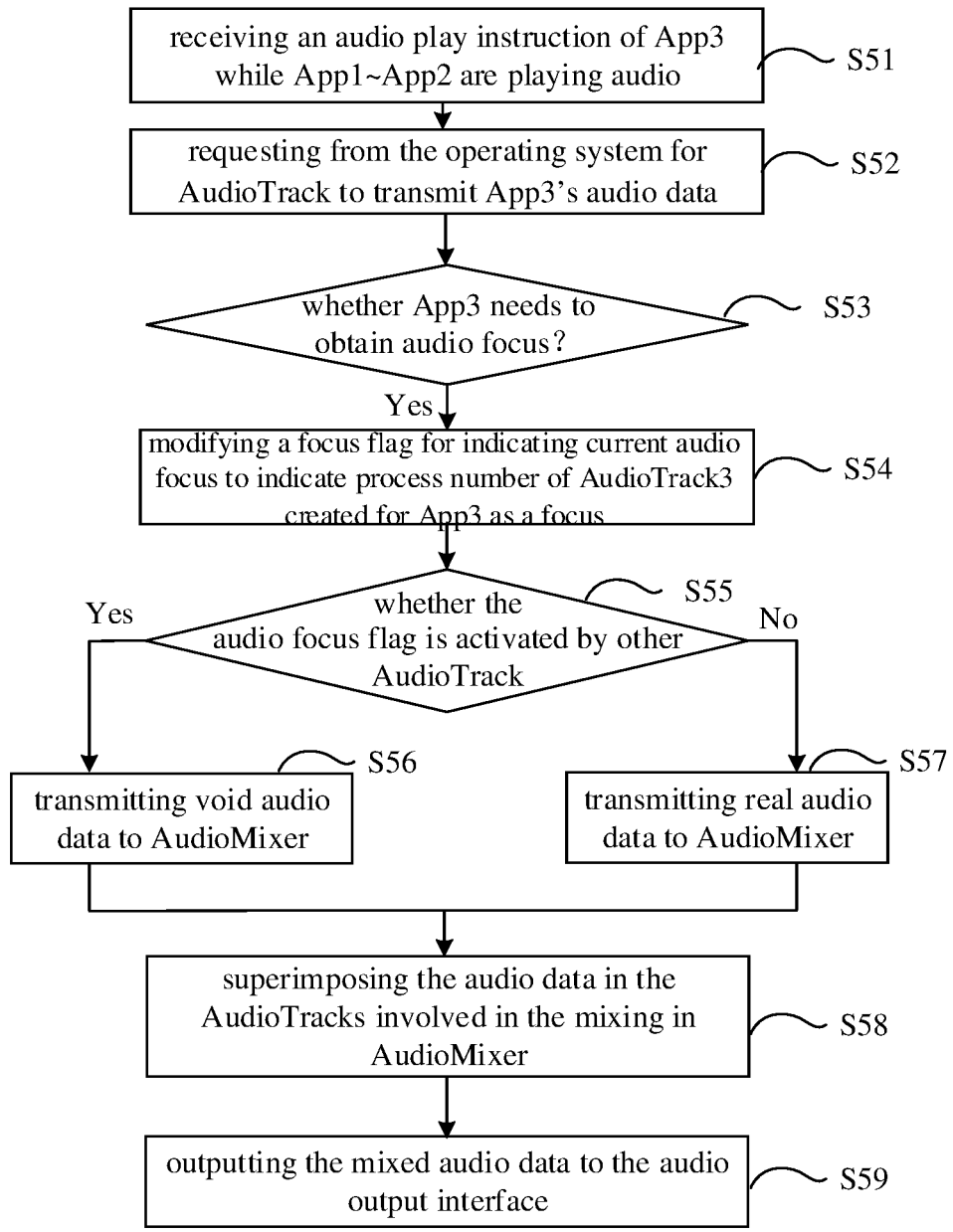
FIG. 4A shows a flow chart of a third output control method for audio data of applications in a display device.
Figure 4B:
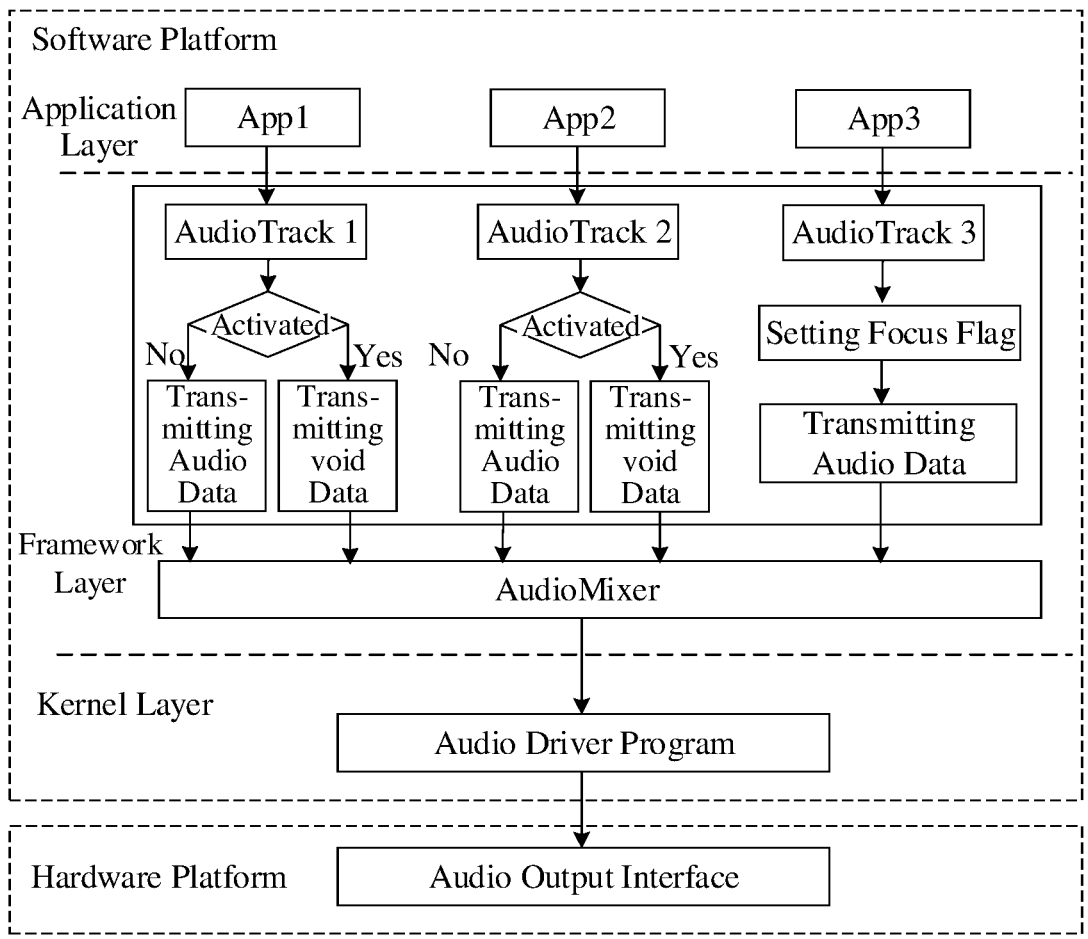
FIG. 4B shows a flow chart of a fourth output control method for audio data of applications in a display device.

As described in the above embodiment, each application in the application layer normally transmits its own audio data to the AudioTrack it has requested. In the AudioMixer, the framework layer controls the output volume of the audio data of the target application that needs to obtain the audio focus to be maintained, and the output volume of the audio data of other applications to be muted before mixing the audio data of each application and outputting it to the audio output interface, so that the user can only hear the audio data of the target application with maintained output volume from the audio output interface, thus meeting the expectation of the user's current operation intention. FIGS. 4A and 4B show the flow chart of an output control method for audio data of another application in a display device. With reference to FIGS. 4A and 4B, the method includes the following steps.

Step S51: while a first application App1 and a second application App2 are playing audio, receiving an audio play instruction of a third application App3.

Step S52: requesting from the operating system for AudioTrack to transmit App3's audio data.

Step S53: determining whether the App3 needs to obtain audio focus; if so, going to step S54; otherwise, terminating the process.

Step S54: modifying a focus flag for indicating the current audio focus to indicate the process number of AudioTrack3 created for the App3 as a focus.

Specifically, when the App3 sends a request for AudioTrack from the operating system, the framework layer obtains the process number of the current AudioTrack requesting process from the operating system, and then queries the package name of the App3 corresponding to the process number. The display device may prestore the application that needs to obtain the audio focus in the white list, for example, putting the package name of the voice assistant application in the white list; and the application in the white list may be dynamically adjusted. In this way, the framework layer compares the package name of the application prestored in the white list with the package name of the App3 corresponding to the AudioTrack requesting process to determine whether the App3 needs to obtain the audio focus.

For example, the package name of the voice assistant application is prestored in the white list. Then, when the framework layer determines that the package name of the App3 corresponding to the current AudioTrack requesting process is the voice assistant application, it is determined that the App3 needs to obtain the audio focus, and then the focus flag for indicating the audio focus acquisition of the current operating system is modified to the process number of AudioTrack 3 created for the App3, that is, the focus flag of the audio focus of the current operating system is activated by the AudioTrack3 requested by the App3 to indicate that the audio focus of the operating system is currently occupied by the App3.

When the framework layer determines that the package name of the App3 corresponding to the current AudioTrack requesting process is not the voice assistant application, it is determined that the App3 does not need to obtain the audio focus, then the step of modifying the focus flag for indicating the current audio focus acquisition may be omitted.

Step S55: determining whether the focus flag for indicating the current audio focus acquisition is activated by another AudioTrack; if the focus flag is activated by an AudioTrack other than AudioTrack 3 created for the App3, going to step S56; otherwise, going to Step S57.

Step S56: transmitting void audio data to AudioMixer.

Step S57: transmitting real audio data to AudioMixer.

Step S58: superimposing the audio data in the AudioTracks involved in the mixing in AudioMixer.

Step S59: outputting the mixed audio data to the audio output interface.

Specifically, when each AudioTrack transmits audio data to the AudioMixer, the framework layer determines whether the focus flag for indicating the acquisition of the current audio focus of the operating system is activated by another AudioTracks, so as to determine whether the real audio data should be transmitted to AudioMixer.

For example, after the App3 (such as voice assistant application) requests from the operating system for AudioTrack, the operating system creates AudioTrack3 for it, and modifies the focus flag for indicating the acquisition of the current audio focus of the operating system to the process number of AudioTrack3 to identify that the App3 is occupying the audio focus of the operating system.

Then, when AudioTrack1 requested by the App1 transmits its audio data to AudioMixer, the framework layer determines that the focus flag for indicating acquiring the current audio focus of the operating system is activated by AudioTrack3, which means that the App1 currently has lost the audio focus of the operating system, then transmits the void audio data to AudioMixer. For example, 0×0 data can be written into AudioMixer.

Similarly, when AudioTrack2 requested by the App2 transmits its audio data to AudioMixer, the framework layer determines that the focus flag for indicating acquiring the acquisition of the current audio focus of the operating system is activated by AudioTrack3, which means that the App2 has currently lost the audio focus of the operating system, then transmits the void audio data to AudioMixer. For example, 0×0 data can be written into AudioMixer.

However, when AudioTrack3 requested by the App3 transmits its audio data to AudioMixer, the framework layer determines that the focus flag for indicating acquiring the current audio focus of the operating system is occupied by AudioTrack3, that is, not activated by another AudioTrack, which means that the App3 is currently occupying the audio focus of the operating system, then transmits the real audio data sent from App3 to AudioTrack3 to AudioMixer.

In this way, when the audio data in the AudioTrack1~AudioTrack3 involved in the mixing is superimposed in AudioMixer, because both the AudioTrack1 requested by the App1 and AudioTrack2 requested by the App2 transmit void audio data to AudioMixer, only AudioTrack3 requested by the App3 transmits the real audio data to AudioMixer, so only the audio data of the App3 will be obtained after mixing, and the user can only hear the audio data of the App3 from the audio output interface, which conforms to the user's current operation intention and improves the user's experience.

In addition, in step S53, when the framework layer determines that the App3 no longer uses the audio focus (for example, after the display device executes the step of exiting from the App3 when receiving the instruction to stop the App3), the focus flag for indicating the current audio focus is deactivated, that is, causing the flag focus for indicating the current audio focus back to the state before App3 acquires the audio focus, and all the audio data in the AudioTracks involved in the mix is superimposed, and then output to the audio output interface.

As described in the above embodiments, in the application layer, each application normally transmits its own audio data to the AudioTrack it has requested. In the framework layer, when AudioTrack transmits audio data to AudioMixer, by transmitting audio data of the target application that needs to obtain the audio focus rather than audio data of other applications to AudioMixer, and then mixing the audio data of the target application and outputting it to the audio output interface, the user can hear only the maintained and real audio data of the target application from the audio output interface, which conforms to the user's current operation intention.

In the above embodiments, the display device only outputs the audio data of the target application by controlling the audio output interface, and does not output the audio data of other applications, thus the user can only hear the audio data of the target application through the audio output interface, which improves the user hearing experience.

On the basis of the above embodiments, the embodiments of the present application also provide a computer-readable non-volatile storage medium, which stores computer programs executable by a computer. When executing the programs on the computer, any one of the above methods can be realized.

The computer-readable non-volatile storage medium may be any available medium or data storage device accessible by a processor in a server, including but not limited to a magnetic memory such as a floppy disk, a hard disk, a magnetic tape, a magneto-optical disk (MO), an optical memory such as an optical disk (CD), a digital universal disk (DVD), a Blu ray disk (BD), a high-definition universal disk (HVD), etc., and semiconductor memory such as an ROM, an Electrically Programmable Read-Only-Memory (EPROM), an Electrically Erasable Programmable Read-Only Memory (EEPROM), a NAND FLASH, a solid state drive (SSD), etc.

For the system/device embodiments, since it is basically similar to the method embodiment, the description is relatively simple, and the relevant parts may be seen in the partial description of the method embodiments.

It should be noted that in this application, relational terms such as first and second are only used to distinguish one item from another item or an operation or another operation, and do not necessarily require or imply any such actual relationship or order between these items or operations.

It should be understood by those skilled in the art that embodiments of the present application may be implemented as methods, systems, or computer program products. Therefore, the present application may take the form of complete hardware embodiments, complete application embodiments, or embodiments combining application and hardware. Moreover, the application may take the form of a computer program product implemented on one or more computer available storage media (including but not limited to a disk memory, a CD-ROM, an optical a memory, etc.) including computer available program codes.

The present application is described with reference to the flow charts and/or block diagrams of methods, devices (systems), and computer program products according to embodiments of the present application. It should be understood that each flow and/or block in the flow charts and/or block diagrams and the combination of flow and/or block in the flow charts and/or block diagrams can be realized by computer program instructions. These computer program instructions can be provided to a general-purpose computer, a special-purpose computer, an embedded processor or a processor of other programmable data processing device to generate a machine, so that a device that can realize the functions specified in one or more flows in the flow charts and/or one or more blocks in the block diagrams can be generated by the instructions executed by processor of a computer or other programmable data processing devices.

These computer program instructions may also be stored in the computer-readable memory that can guide computer or other programmable data processing devices to work in a specific way, enabling the instructions stored in the computer-readable memory to generate a manufacturing product including instruction device, and the instruction device can realize the functions specified in one or more flows in the flow charts and/or one or more blocks in the block diagrams.

These computer program instructions may also be loaded on computer or other programmable data processing devices, enabling a series of operation steps executed on the computer or other programmable devices to produce computer-realized processing, so that the instructions executed on the computer or other programmable devices can provide steps for realizing the functions specified in one or more flows in the flow charts and/or one or more blocks in the block diagrams.

Although embodiments of the present disclosure have been described, those skilled in the art may make additional changes and modifications to these embodiments once they have learned the basic inventive concepts. Therefore, the appended claims are intended to include embodiments and all changes and modifications falling within the scope of the present disclosure.

Obviously, those skilled in the art can make various changes and modifications to the application without departing from the spirit and scope of the present disclosure. Thus, if these modifications and variations of the present disclosure fall within the scope of the claims of the present disclosure and its equivalent technology, the present disclosure also intends to include these modifications and variations.

The invention claimed is:

1. A method for outputting audio data of applications in a display device operating in an Android system, the method comprising:
    while first audio data of one or more first applications is playing by the display device through an audio output interface of the display device, receiving a first input instruction for playing second audio data of a second application;
    in response to the first input instruction, determining whether the second application is in a white list of applications that need to acquire an audio focus of an operating system in the display device;
    in response to determining that the second application is in the white list, modifying an audio StreamType corresponding to the second audio data to a predefined StreamType, wherein the StreamType is an indicator of a type of audio stream corresponding to the audio data being transmitted, and wherein the predefined StreamType is different than the audio StreamType;
    determining whether a second AudioTrack is created for the second application with the predefined StreamType in one or more AudioTracks involved in a mixing, wherein the one or more AudioTracks comprises one or more first AudioTracks corresponding to the one or more first applications and the second AudioTrack;
    in response to determining that the second AudioTrack is created for the second application with the predefined StreamType in the one or more AudioTracks, controlling output volume of the first audio data to be muted, and output volume of the second audio data to be maintained;
    superimposing the muted first audio data and the second audio data with maintained output volume by an AudioMixer to obtain a mixed audio data, wherein the mixed audio data comprises the muted first audio data and the second audio data with maintained output volume; and
    outputting the mixed audio data through the audio output interface.

2. The method according to claim 1, wherein determining whether the second application needs to acquire the audio focus of the operating system in the display device comprises:
    determining a package name of the second application;
    determining whether the package name of the second application is included in the white list of applications that need to acquire the audio focus; and
    in response to the package name of the second application being included in the white list, determining that the second application needs to acquire the audio focus.

3. The method according to claim 2, wherein the second application comprises a voice assistant application.

4. The method according to claim 1, further comprising:
    receiving a second input instruction to stop playing the second audio data;
    in response to the second input instruction, controlling the output volume of the first audio data to restore from muting to volume before the first input instruction for playing the second audio data is received; and
    outputting the first audio data with restored output volume through the audio output interface.

5. A display device operating in an Android system, the display device comprising a user interface, an audio output interface, a memory and a controller, wherein:

the memory is in communication with the user interface and the audio output interface, and is configured to store computer programs, instructions associated with the user interface, and audio data associated with the audio output interface;

the controller is in communication with the user interface, the audio output interface and the memory, and is configured to execute the computer programs and/or the instructions to cause the display device to:

while first audio data of one or more first applications is playing by the display device through the audio output interface of the display device, receive a first input instruction for playing second audio data of a second application;

in response to the first input instruction, determine whether the second application is in a white list of applications that need to acquire an audio focus of an operating system in the display device;

in response to determining that the second application is in the white list, modify an audio StreamType corresponding to the second audio data to a predefined StreamType, wherein the StreamType is an indicator of a type of audio stream corresponding to the audio data being transmitted, and wherein the predefined StreamType is different than the audio StreamType;

determine whether a second AudioTrack is created for the second application with the predefined StreamType in one or more AudioTracks involved in a mixing, wherein the one or more AudioTracks comprises one or more first AudioTracks corresponding to the one or more first applications and the second AudioTrack;

in response to determining that the second AudioTrack is created for the second application with the predefined StreamType in the one or more AudioTracks, control output volume of the first audio data to be muted, and output volume of the second audio data to be maintained;

superimpose the muted first audio data and the second audio data with maintained output volume by an AudioMixer to obtain a mixed audio data, wherein the mixed audio data comprises the muted first audio data and the second audio data with maintained output volume; and output the mixed audio data through the audio output interface.

6. The display device according to claim 5, wherein the controller is further configured to execute the computer programs and/or the instructions to cause the display device to:

determine a package name of the second application;

determine whether the package name of the second application is included in the white list of applications that need to acquire the audio focus; and in response to the package name of the second application being included in the white list, determine that the second application needs to acquire the audio focus.

7. The display device according to claim 6, wherein the second application comprises a voice assistant application.

8. The display device according to claim 5, wherein the controller is further configured to execute the computer programs and/or the instructions to cause the display device to:

receive a second input instruction to stop playing the second audio data;

in response to the second input instruction, control the output volume of the first audio data to restore from muting to volume before the first input instruction for playing the second audio data is received; and output the first audio data with restored output volume through the audio output interface.

* * * * *